US008161391B2

(12) United States Patent
McClelland et al.

(10) Patent No.: US 8,161,391 B2
(45) Date of Patent: Apr. 17, 2012

(54) ON-BOARD INPUT AND MANAGEMENT DEVICE FOR A COMPUTING SYSTEM

(75) Inventors: Belgie B. McClelland, Tomball, TX (US); Troy A. Della Fiora, Spring, TX (US); Montgomery C. McGraw, Spring, TX (US); John R. Grady, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 12/121,968

(22) Filed: May 16, 2008

(65) Prior Publication Data

US 2008/0313539 A1 Dec. 18, 2008

Related U.S. Application Data

(60) Provisional application No. 60/943,423, filed on Jun. 12, 2007.

(51) Int. Cl.
*G06F 15/177* (2006.01)
*G06F 3/00* (2006.01)
*G06F 15/173* (2006.01)

(52) U.S. Cl. ......... 715/735; 715/705; 715/736; 709/224
(58) Field of Classification Search ................ 715/736, 715/735, 705, 223; 709/224
See application file for complete search history.

(56) References Cited

U.S. PATENT DOCUMENTS

| 6,384,842 B1* | 5/2002 | DeKoning et al. ............ 715/734 |
| 6,442,030 B1* | 8/2002 | Mammoser et al. .......... 361/727 |
| 6,462,670 B1 | 10/2002 | Bolognia et al. |
| 6,563,516 B1* | 5/2003 | Orlofsky ........................ 715/735 |
| 6,915,362 B2* | 7/2005 | Ramsey et al. ................. 710/62 |
| 7,146,447 B2* | 12/2006 | Chari et al. .................... 710/302 |
| 7,209,347 B2* | 4/2007 | Liang et al. .................... 361/752 |
| 7,302,593 B2* | 11/2007 | Rothman et al. .............. 713/300 |
| 7,328,410 B2* | 2/2008 | King et al. ..................... 715/771 |
| 7,363,392 B2* | 4/2008 | Thomas ............................ 710/8 |
| 7,477,949 B2* | 1/2009 | Zohar et al. ..................... 700/17 |
| 7,669,139 B2* | 2/2010 | Hintermeister et al. ...... 715/771 |
| 7,844,768 B2* | 11/2010 | Tanaka .......................... 710/302 |
| 7,853,880 B2* | 12/2010 | Porter ........................... 715/734 |
| 7,890,677 B2* | 2/2011 | Chandrasekhar et al. ...... 710/62 |
| 2003/0226004 A1 | 12/2003 | Abbondanzio |
| 2004/0103180 A1 | 5/2004 | Brown |
| 2004/0210887 A1 | 10/2004 | Bergen |
| 2004/0255171 A1 | 12/2004 | Zimmer |
| 2005/0041019 A1* | 2/2005 | King et al. .................... 345/184 |
| 2005/0195075 A1 | 9/2005 | McGraw |
| 2005/0215128 A1 | 9/2005 | Levy |
| 2006/0221579 A1 | 10/2006 | Liang |

(Continued)

FOREIGN PATENT DOCUMENTS

| JP | 2006228220 A | 8/2006 |
| WO | 2006063276 A1 | 6/2006 |

* cited by examiner

*Primary Examiner* — Tadeese Hailu
*Assistant Examiner* — Nicholas Ulrich

(57) ABSTRACT

An on-board input and management device is disclosed. In an exemplary implementation, a method of managing a blade computing system may include monitoring current systems status in a blade computing system with an integrated management controller. The method may also include using the integrated management controller for user interaction to monitor and modify configuration of a plurality of modules in the blade computing system. In an exemplary embodiment, all of the modules in the blade computing system may be monitored and managed.

20 Claims, 9 Drawing Sheets

U.S. PATENT DOCUMENTS

| | | |
|---|---|---|
| 2007/0027948 A1 | 2/2007 | Engebretsen |
| 2007/0047195 A1 | 3/2007 | Merkin |
| 2007/0150757 A1 | 6/2007 | Aldereguia |
| 2007/0175837 A1* | 8/2007 | Furman .......................... 211/26 |
| 2008/0059626 A1* | 3/2008 | Campbell et al. ............. 709/224 |
| 2008/0120567 A1* | 5/2008 | Karstens ....................... 715/772 |
| 2008/0215986 A1* | 9/2008 | Bayang et al. ................ 715/735 |

Fig. 3g

Enclosure Settings — 322

| | |
|---|---|
| Power Mode | AC Rendundant? |
| Power Limit | Not Set? |
| Dynamic Power | Enabled? |
| OA1 IP Address | 10.128.126.204? |
| OA2 IP Address | Not Present? |
| Encl Name | CT-VC1? |
| Rack Name | CT-VC? |
| DVD Drive | Connect...? |
| Insight Display PIN# | Not Set? |

ⓘ  Accept All  |  Settings Help

Fig. 3h

DVD Connect Status — 324

| 4 | ! iLOUpgr | 8 | ? Unknown |
|---|---|---|---|
| 3 | ! iLOUpgr | 7 | ? Unknown |
| 2 | ? Unknown | 6 | ? Unknown |
| 1 | Connect | 5 | Connect |

ⓧ  Back  |  Help

US 8,161,391 B2

ON-BOARD INPUT AND MANAGEMENT DEVICE FOR A COMPUTING SYSTEM

PRIORITY APPLICATION

This application claims priority to co-owned U.S. Provisional Patent Application Ser. No. 60/943,423 filed Jun. 12, 2007 and hereby incorporated by reference as though fully set forth herein.

BACKGROUND

Blade enclosures are usually found installed in data centers. Data centers are usually remote installations where a few technicians handle the day-to-day operations of installing, removing, and monitoring the operations of systems. However, substantive monitoring is usually handled in an external manner. That is, the technicians have little knowledge of what programs are executing on the systems or how the systems are being used. Control over this information is the domain of system administrators who are usually located at a separate business site where the system administrators can easily interact with the end-users of these systems.

For security reasons, many data centers do not allow actual keyboard and monitors to be locally connected to the systems at the data centers, because these could provide an opening into the systems physical operations and allow unauthorized personnel to view data on the machines. Instead, full size computer monitors and keyboards at the business site are connected to the system through a remote network connection. Thus, the system administrator at the business site can stay abreast of what is happening on the system at the remote data center.

A variety of software tools are available to present information for the system administrator in various text and graphic displays. These tools allow the system administrator to readily determine which programs are running, who is using the system, how the system is operating, speed, temperature, usage capacity, etc. Unfortunately, some of this information may need to be made available to the technicians on site at the data center because the technicians have access to the physical equipment and are in a better position to fix some types of errors in the hardware operations of the system.

This information may be conveyed by colored lights and speaker tones which identify a failed component for the technician at the remote data center. For purposes of illustration, a flashing LED may identify a failed cooling fan for the technician. Since the entire machine runs together as a single unit, the technician may turn it off, make the repairs and bring the system back up. If the module failed, the system was already down, so having the technician turn off the system was of little consequence to the users. However, a flashing LED cannot differentiate between a failed component and a component that perhaps simply needs to be checked or quickly restarted. If the module did not fail and the technician shut down the entire system, such an interruption would be unacceptable to the end-users.

BRIEF DESCRIPTION OF THE DRAWINGS

FIGS. 3a-k are graphics illustrations showing exemplary information displayed on an exemplary on-board input and management device.

DETAILED DESCRIPTION

Exemplary embodiments of an on-board input and management device (also referred to as an "integrated management controller") are disclosed. The on-board input and management device enables technicians to manage and trouble shoot components of a system when a standard user interface device is not readily available, e.g., at a remote data center.

Figure 1:
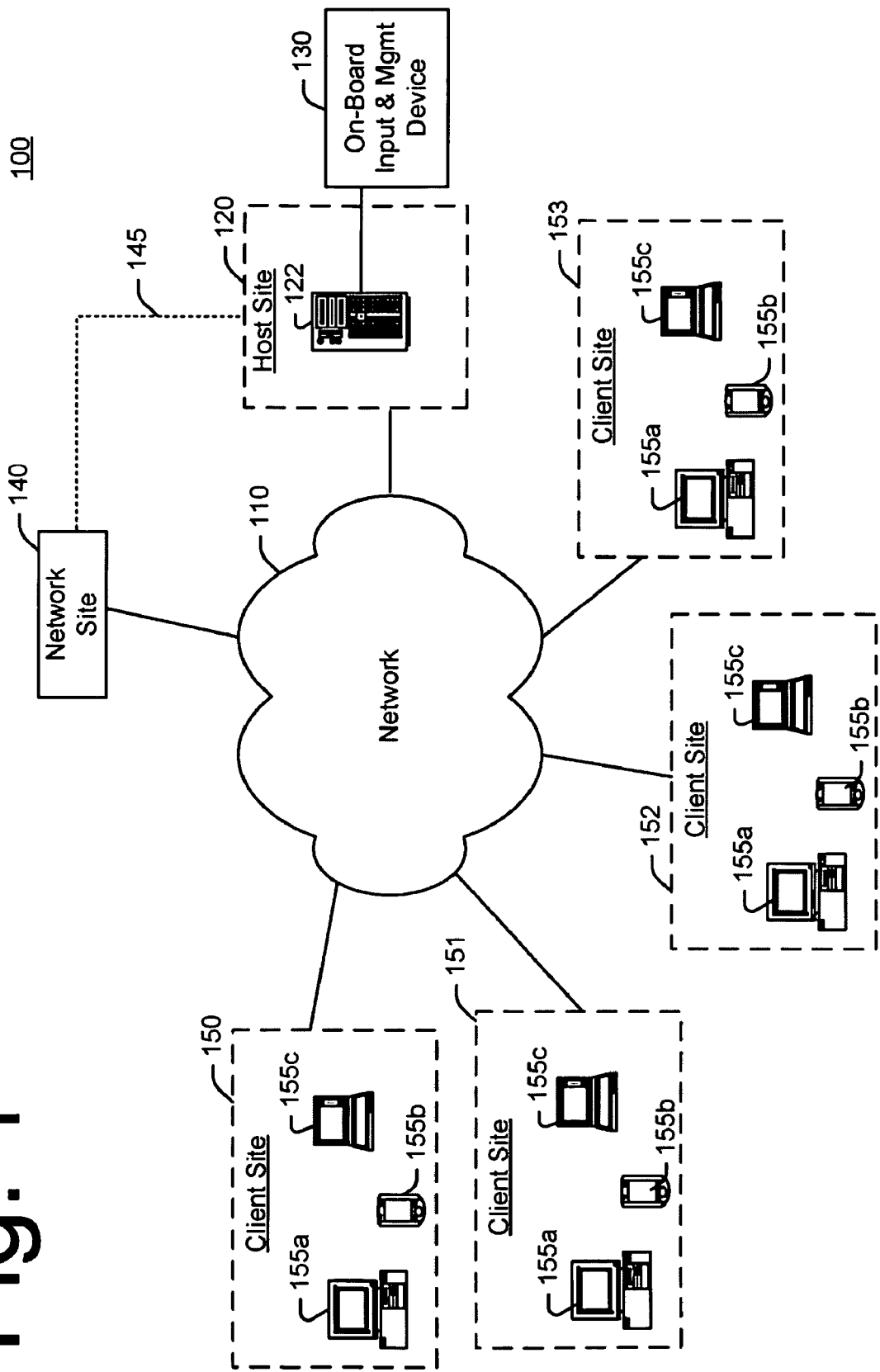
FIG. 1 is a high-level illustration of an exemplary networked computer system in which an on-board input and management device may be implemented.

FIG. 1 is a high-level illustration of an exemplary networked computer system 100 which may be implemented between a host site 120 (e.g., a remote data center) and one or more client sites 150-153 (e.g., a local business site). The networked computer system 100 may include one or more communication networks 110, such as a local area network (LAN) and/or wide area network (WAN).

Host site 120 may include one or more computing systems, such as a blade computing system or "rack" system 122 with a plurality of chassis or blade enclosures. Host 120 may execute any of a wide variety of applications implemented in software. Host site 120 may also provide services to other computing or data processing systems or devices. For example, host site 120 may also provide transaction processing services, email services, etc.

Host site 120 may be provided on the network 110 via a communication connection, such as a dial-up, cable, or DSL connection via an Internet service provider (ISP). Host site 120 may be accessed directly via the network 110, or via a network site 140. In an exemplary embodiment, a web portal on a third-party venue (e.g., a commercial Internet site) may facilitate a connection for one or more clients with host 120 (e.g., via back-end link 145).

The term "client" as used herein refers to one or more computing device at the client site through which one or more users (e.g., via client computing devices 155a-c) may access the host site 120. Client computing devices 155a-c may include any of a wide variety of computing systems, such as a stand-alone personal desktop or laptop computer (PC), workstation, personal digital assistant (PDA), or appliance, to name only a few examples. Each of the client computing devices may include memory, storage, and a degree of data processing capability at least sufficient to manage a connection to the host site either directly via network 110, or indirectly (e.g., via network site 140). Client computing devices may connect to network 110 via a communication connection, such as a dial-up, cable, or DSL connection via an Internet service provider (ISP).

The term "host" as used herein refers to one or more computing device which provides services to one or more client site 150-153. The host may be implemented as a rack system 122 at the host site, as explained in more detail below with reference to FIG. 2. An on-board input and management device 130 may be installed at the host site enables technicians to manage and trouble shoot components of a computing system (e.g., rack system 122) when a standard user interface device is not readily available (e.g., at a remote data center) without compromising the security of applications and data at the host site 120.

Figure 2:
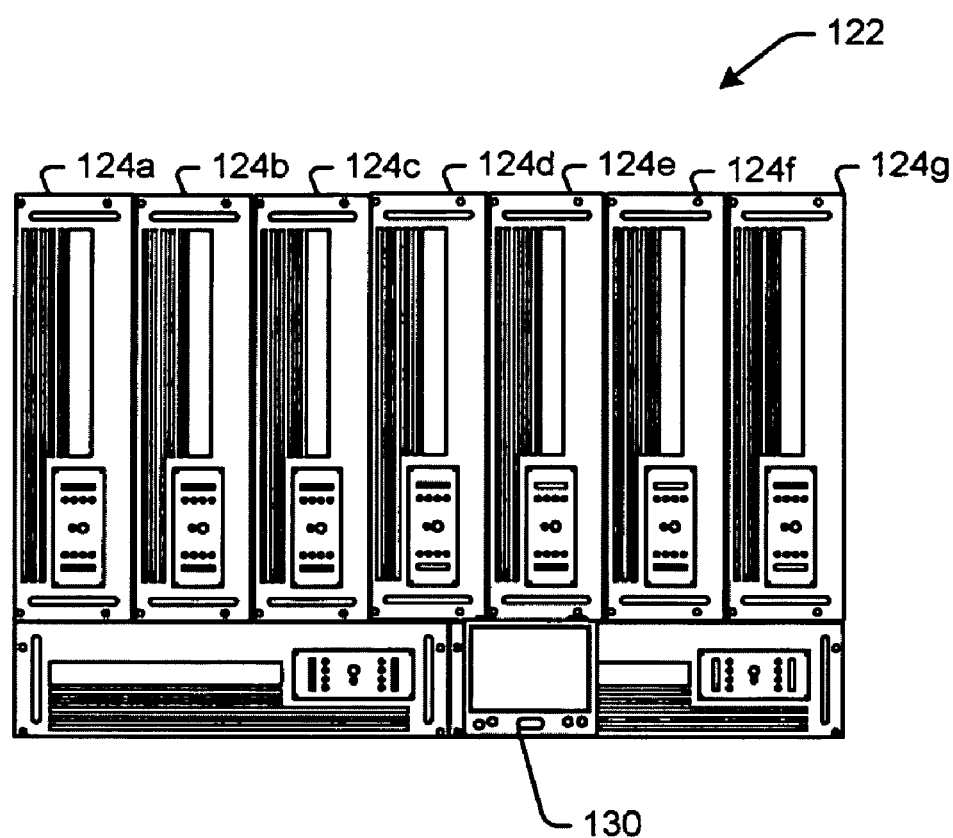
FIG. 2 is a front plan view of an exemplary rack system such as may be installed at a host site, showing an exemplary on-board input and management device.

FIG. 2 is a front plan view of an exemplary rack system 122 such as may be installed at a host site (e.g., host site 120 in FIG. 1), showing an exemplary on-board input and management device 200. Exemplary rack system 122 may include a plurality of chassis or blade enclosures 124a-g, which are typically mounted within a housing. The blade enclosures 124a-g may be any suitable size and shape and may be manufactured of any suitable material, such as, e.g., a plastic or metal enclosure suitable for mounting in the housing of the rack system 122.

Each blade enclosure 124a-g may house electronic and other electronic devices. For example, the blade enclosures 124a-g may house a PC board including one or more processing units or processors and other devices and components mounted to, connected to, or positioned near the PC board. For example, rack mount servers may include data storage devices (e.g., hard disk drives, compact disc (CD) or digital versatile disc (DVD) drives, etc.) and operate in a communications network, and therefore include suitable network connection interface(s). Still other devices and components may also be mounted on or otherwise connected to the PC board, as is readily apparent to one having ordinary skill in the computer and electronic arts.

Before continuing, it is noted that the on-board input and management device 130 is not limited to use with any particular type, number, or configuration of rack system 122, blade enclosure, computer, or other electronic device. Nor is the on-board input and management device 130 limited to use in any particular type of networked computer system. The networked computer system 100 shown in FIG. 1, and the rack system 122 shown in more detail in FIG. 2 are provided as illustrations of exemplary operational environments, but are not intended to be limiting in any manner.

The on-board input and management device 130 may be installed at the host site to enable technicians to manage and trouble shoot a plurality or all components 124a-g of the rack system 122.

Figure 2A:
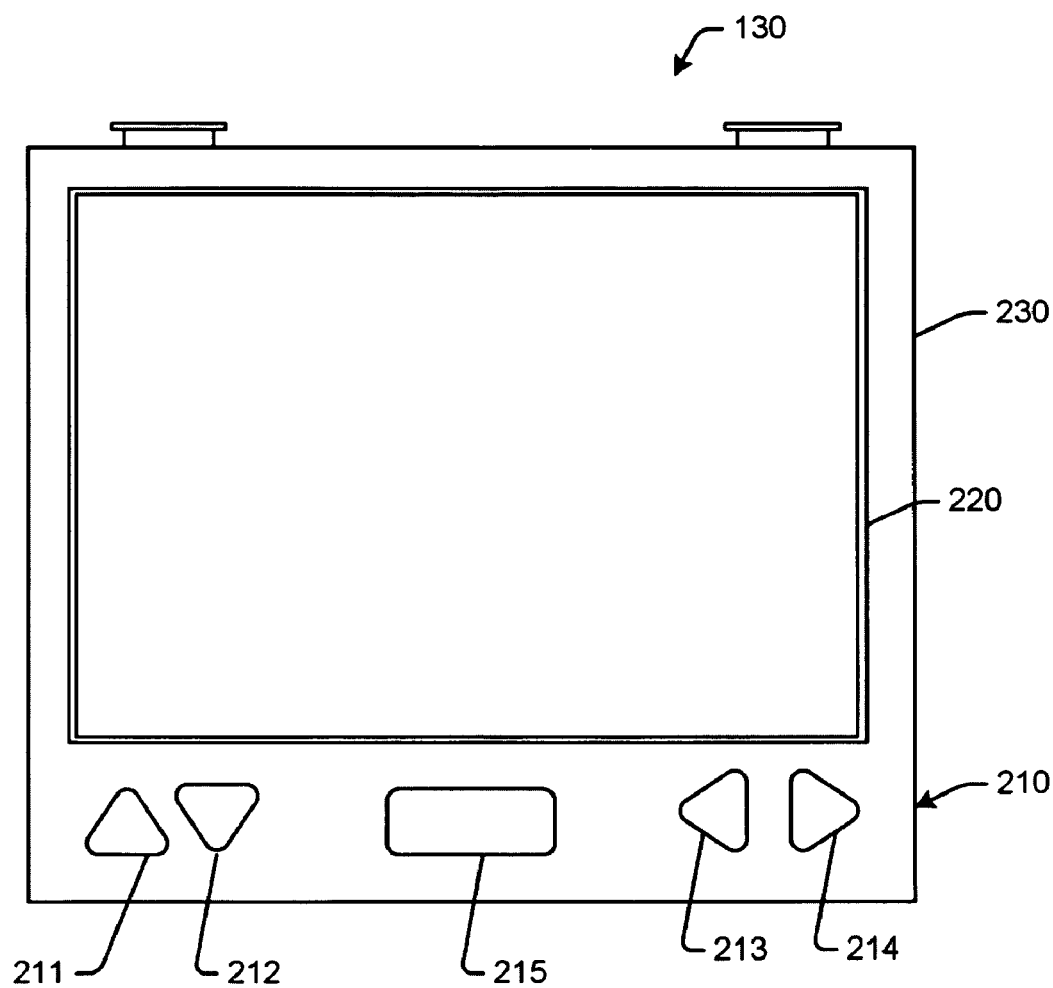
FIG. 2a is a more detailed front plan view of the exemplary on-board input and management device shown in FIG. 2.

FIG. 2a is a more detailed front plan view of the exemplary on-board input and management device 130 shown in FIG. 2. In an exemplary embodiment, the on-board input and management device includes at least one input device 210 (e.g., up/down arrow buttons 211, 212; left/right buttons 213, 214; and accept button 215), and at least one output device (e.g., liquid crystal display (LCD) 220), in a housing 230 (e.g., injection molded plastic or other suitable material of manufacture).

Although not required, the output device 220 may be relatively small (e.g., approximately 2 to 5 inch) and a limited number of buttons may be provided in keeping with the desire for minimal footprint in rack systems (an Onboard display). Of course other embodiments are also contemplated. For example, the on-board input and management device 130 may include a touch-screen display, so that separate input devices are not needed. Also for example, the output device may also include audible output.

It is noted that modifications may be made to size, contour, and/or configuration of the input device 210 and output device 220 so that the on-board input and management device 130 can be used with any of a wide variety of systems now known or later developed. Such modifications may depend at least to some extent on design considerations, as will be readily apparent to those having ordinary skill in the art after becoming familiar with the teachings herein.

In an exemplary embodiment, the input device 210 and output device 220 are coupled to an integrated management processor so that the on-board input and management device 130 provides a simple input device to manage blade servers. The integrated management processor may be provided on a printed circuit board PCB and housed in the on-board input and management device 130, or otherwise operatively associated with the on-board input and management device 130.

Some or all components 124a-g within the rack system 122 may be controlled and managed. Installation of the components 124a-g can also be accomplished using pictorial diagram displayed of components and processes; text alerts for failures, warnings, and health status issues; and power and performance can be managed.

Accordingly, an onsite technician can be given access to the physical operation of the machines, without having access to the operating system and the data in the machine (for security purposes). The management processor and the display together allow the technician to access all physical information regarding the entire enclosure. The technician can view the enclosure as a whole seeing things like ambient temperature, power consumption, etc., or select a single blade server to examine, allowing him to view memory, processors, internal temperature, NIC address, MAC address, etc.

In addition, the on-board input and management device 130 may be powered up to assist with installation of various components of the rack system 122. For example, the on-board input and management device 130 may be used to walk a new customer through a number of steps to bring the enclosure online/ready. Warnings and failures may be displayed by a flashing screen and additional data. After installation, pictorial diagrams may assist customers when locating servers, switches, fans, power supplies, management modules, servers, etc. The customer may make selections using a page up, page down, enter, ok, update, etc. buttons from the input device 210.

In addition, the device enables allow input and output to multiple blade servers. The new unit connected to an onboard administrator allows control over all blades, i/o switches, power modules, air movers, etc. located within the enclosure. These and other features will be explained in more detail with reference to the illustrations shown in FIGS. 3a-k.

FIGS. 3a-k are graphics illustrations showing exemplary information displayed on an exemplary on-board input and management device 130. In exemplary embodiments, software and/or firmware executes on or in conjunction with the on-board input and management device 130 (e.g., by the integrated management processor) to implement the methods and generate the output described herein (generally referred to herein as "program code").

The program code may be implemented as one or more modules (also referred to as code subroutines, or "objects" in object-oriented programming). The location of the software may differ for various alternative embodiments. The software programming code, for example, is accessed via a bus by a processor or processors from long-term storage media of some type, such as on-board memory. Alternatively, the program code may be embodied or stored on any of a variety of known media for use with a data processing system or in any memory device such as semiconductor, magnetic and optical devices, including a disk, hard drive, CD-ROM, ROM, etc. The code may also be distributed on such media, or is distributed to users over a network of some type. The techniques and methods for embodying program code in memory, on physical media, and/or distributing software code via networks are well known and will not be further discussed herein.

Figure 3A:
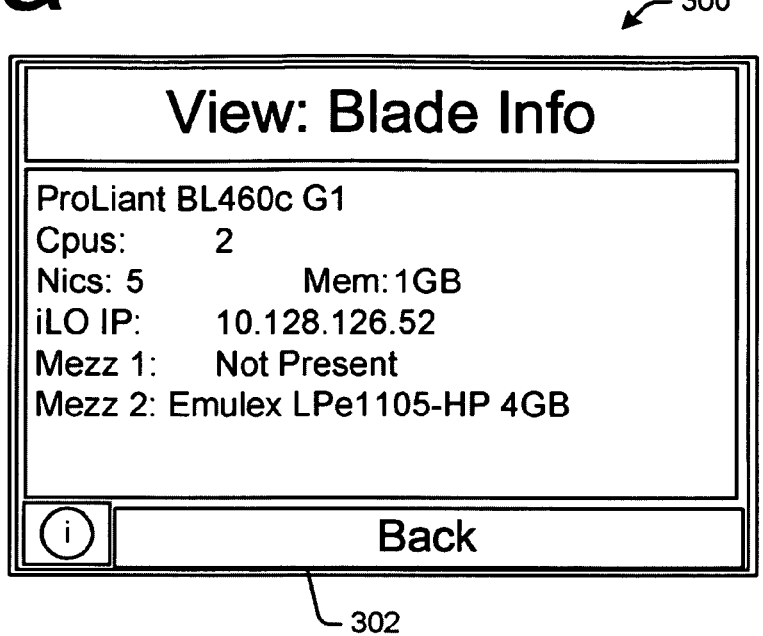
Figure 3B:
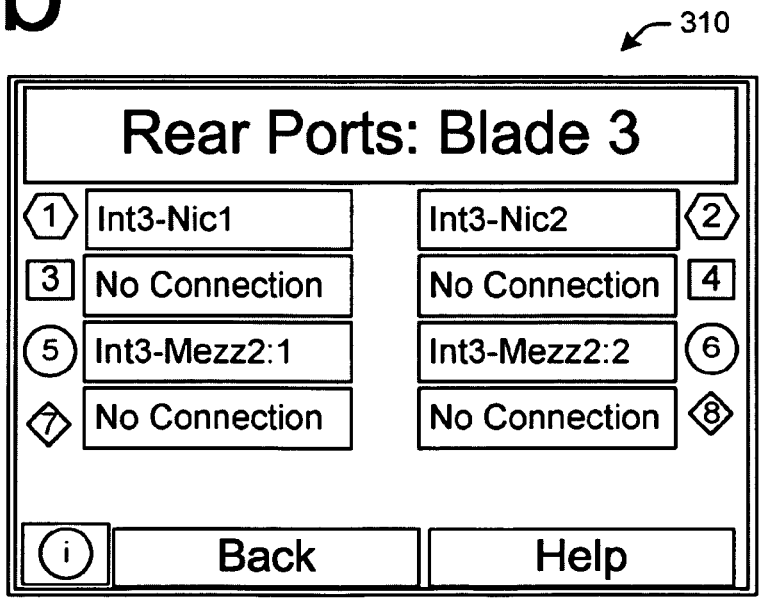
Figure 3C:
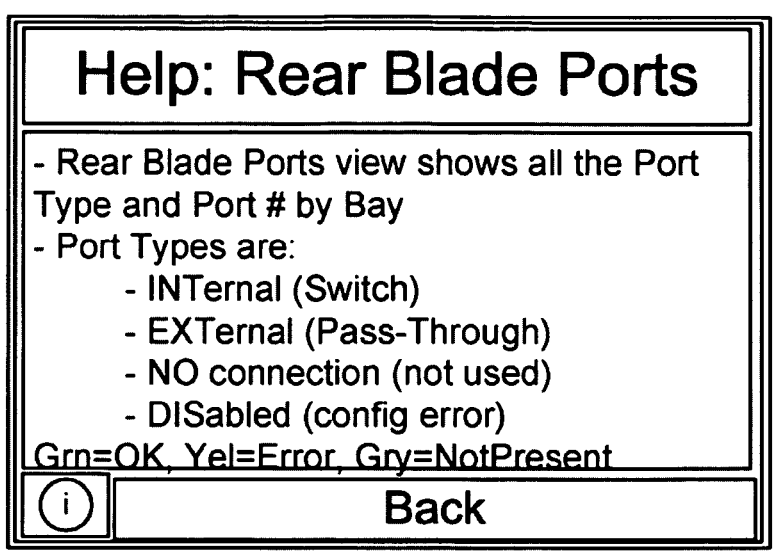
Figure 3D:
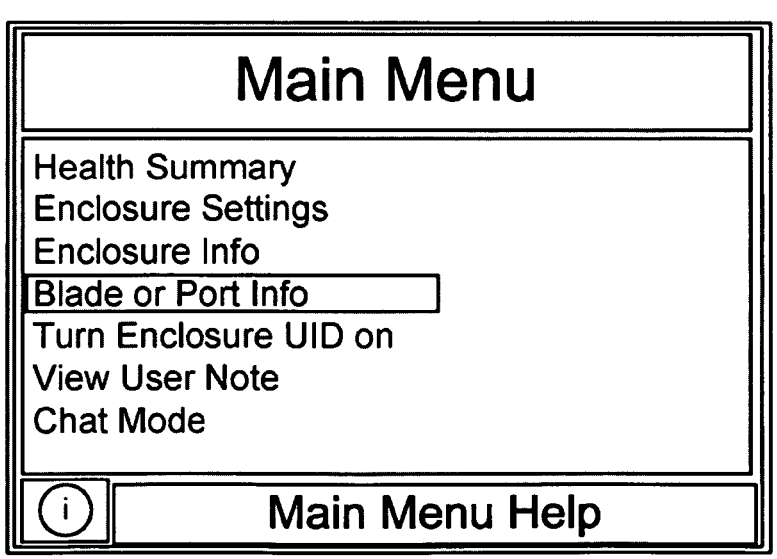

In an exemplary embodiment, the program code enables control over multiple blades (or all of the blades) in the rack system 122, and enables user interaction by displaying information for each blade enclosure 124a-g. Exemplary display 300 is shown in FIG. 3a displaying, e.g., product name, number of CPUs, memory size, number of embedded NICs, including iSCSI, iLO IP address, and a description of each installed Mezzanine option card (Mezz), etc. Additional information may be accessed by the user by selecting the back button 302 (e.g., using input device 210 in FIG. 2*a*).

It is noted that user an input device such as the input device 210 shown in FIG. 2*a* to make selections displayed on an output device (e.g., an LCD display) is well understood in the arts, and therefore further description is not included herein for sake of clarity. In addition, other user selections may also be provided (e.g., as shown in subsequent figures). User selections such as these are also well understood in the arts and not described further herein.

Exemplary display 310, 312 (FIGS. 3*b* and 3*c*, respectively) may also include port mapping for embedded network interface card (NIC) ports and mezzanine ports to each specific interconnect module in the rear on the Port Information screen. In this illustration, the difference between an internal port to a switch (Int), versus actual physical external port from a pass-through (Ext) is shown, and disabled or no connections, as shown by the context sensitive Help screen available on each Insight Display screen (display 314 in FIG. 3*d*).

Note that the port information (FIG. 3*b*) allows more than one port per bay, and includes the same icon as used on the physical enclosure bays and the server hood labels to help the customer understand the connectivity. For example, the color gray may indicate that there is nothing in a particular bay, although the server could have a mezz card connection to the bay. Also for example, Int3-Mezz2:1 indicates Blade 3, Mezz 2, Port 1 is connected to Interconnect 5 internal port 3, and that mezz 2 port 2 is connected to Interconnect 6 internal port 3.

Figure 3E:
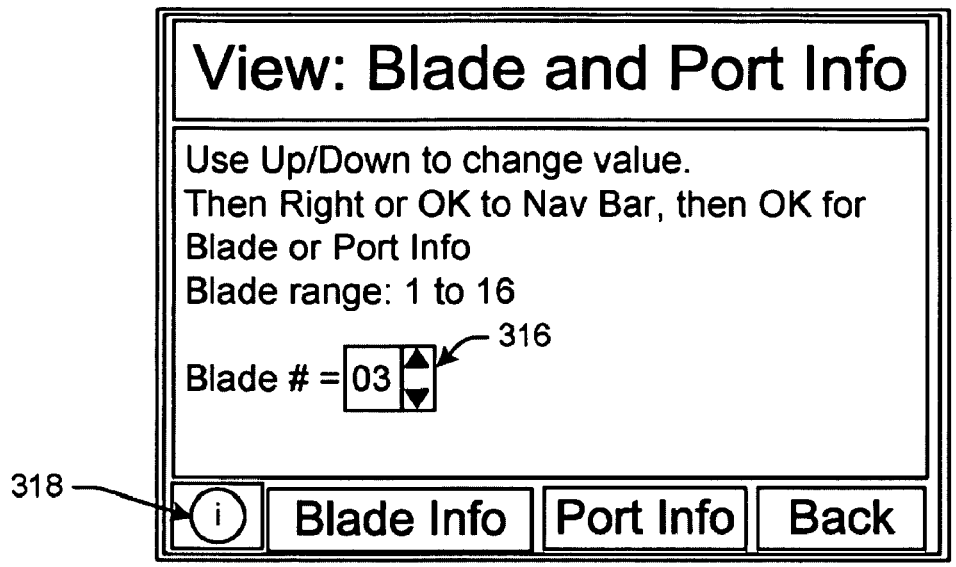
Figure 3F:
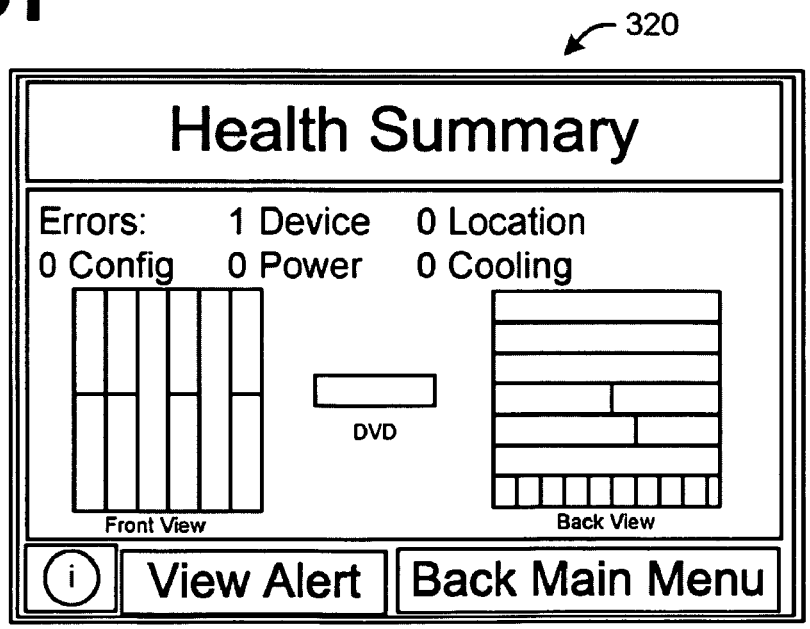
Figure 3I:
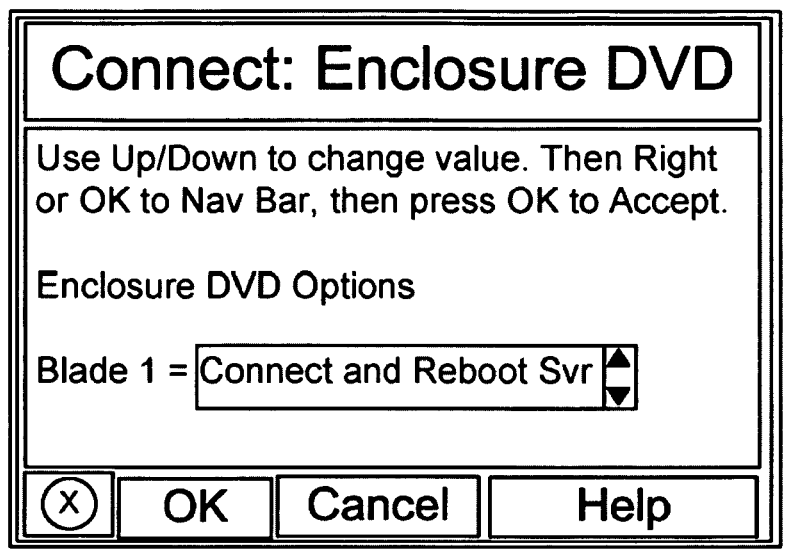
Figure 3J:
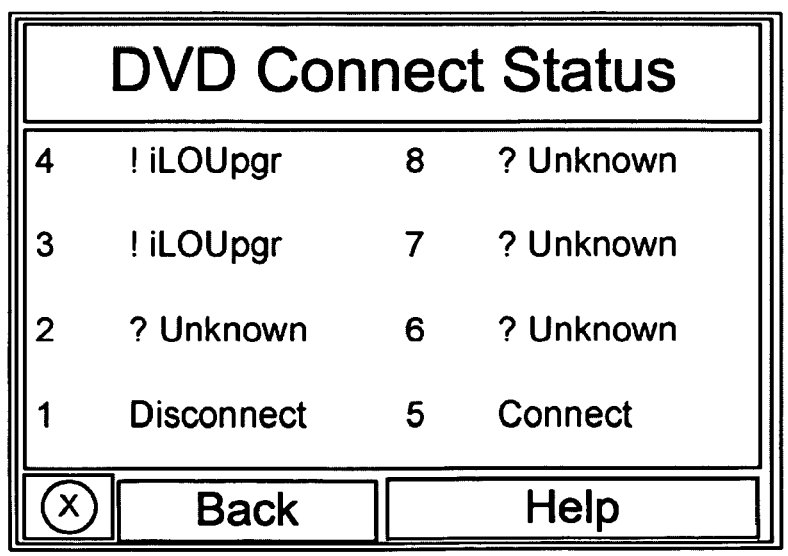

FIG. 3*e* illustrates viewing information of a specific blade. In this example, the user may choose which blade to communicate with by using the display buttons 316 to highlight and then press OK when pointed to the item on a Main selection menu. See FIG. 4. Then the user operates the display arrow buttons to highlight and press OK after dialing in the blade bay number. The arrow buttons may be used to highlight and press OK on Blade Info, Port Info, or Back. The enclosure health icon 318 on the left of the bottom navigation bar is also available and when selected navigates immediately to the enclosure Health Summary screen.

An exemplary Health Summary 320 is shown in FIG. 6. In an exemplary embodiment, color may be used to display the Health Summary, wherein color may indicate the following:
Device Status: (includes all enclosure bays: Device Bays, Power Supply Bays, Fan Bays, Interconnect Bays, OA bays, OA Tray, Power Supply Inputs
black=not present
dark green=present but powered off and health OK
bright green=present and powered on with health OK
blue=information alert
yellow=caution alert
red=failed alert
Error Status Counters
Device Errors (an info error in this case half-height blade in bay 12 has iLO network problem)
Location Errors (blade in incorrect bay such as SB40c DAS storage blade not adjacent to server)
Configuration Errors (electronic keying check error—technology mismatch between device and interconnect)
Power Errors (insufficient enclosure power to permit device poweron)
Cooling Errors (insufficient cooling to permit device poweron)
Overall Enclosure Health Status
Background color of each Insight Display screen:
Green=OK,
Amber=caution or failed enclosure subsystem
Enclosure UID State
Background color of each Insight Display screen:
Blue=enclosure UID is ON,
Default health color=enclosure UID is OFF In addition to managing enclosure settings 322 as illustrated in FIG. 3*g*, items 324, 326, and 328 such as connection enclosure media may also be managed to a particular server (e.g., for rebooting the server), as illustrated FIGS. 3*h*-*j*. For purposes of illustration, a DVD icon for bay 1 has changed to indicate that server (iLO) is now connected to the enclosure DVD media.

Figure 3K:
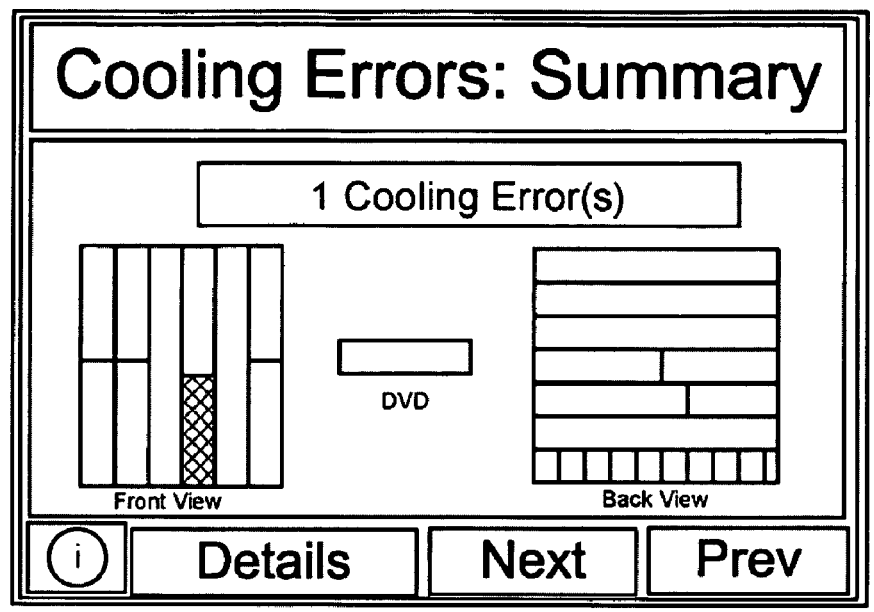

Pictorial diagrams 330 may also be used to illustrate components and processes and to assist when locating servers, switches, fans, power supplies, management modules, servers, etc., as shown in FIG. 3*k*. These pictorial diagrams convey, at a glance, count, quantity and placement of modules as well as other information regarding the configuration and status of each module.

It is noted that the output shown in FIGS. 3*a*-*k* are exemplary in nature and should not be construed as limiting of such output or the embodiments of the on-board input and management device. In addition, the ordering of FIGS. 3*a*-*k* should not be construed as steps that must proceed in a particular order. Additional output may be added, removed, or the ordering altered. Further, output within different figures can be added to or exchanged with other output shown in other figures. Further yet, specific numerical data values (such as specific quantities, numbers, categories, etc.) or other specific information shown in FIGS. 3*a*-*k* should be interpreted as illustrative for discussing exemplary embodiments. Such specific information is not provided to be limiting in any manner.

The invention claimed is:

1. A method of managing a blade computing system, comprising:
monitoring current systems status in a blade computing system with an integrated management controller;
using the integrated management controller for user interaction to monitor and modify configuration of a plurality of modules in the blade computing system, configuration including a graphic representation of port mapping for embedded network interface card (NIC) ports and mezzanine ports to each specific interconnect module for rear ports otherwise not visible to a user, the graphic representation distinguishing between physical external ports from a pass-through and disabled ports; and
using the integrated management controller for assisting the user with installation of a new module in the blade computing system.

2. The method of claim 1, wherein using the integrated management controller is to monitor and modify configuration of all the modules in the blade computing system.

3. The method of claim 1, wherein using the integrated management controller is at a host site, the host site being physically remote from a client site.

4. The method of claim 1, further comprising providing security to applications and data on the blade computing system while simultaneously providing user interaction with the blade computing system.

5. The method of claim 1, further comprising powering the integrated management controller during start-up for assisting a user with steps to bring one or more of the modules in the blade computing system online.

6. The method of claim 1, further comprising displaying on the integrated management controller warnings, failures, and status of all modules in the blade computing system.

7. The method of claim 1, further comprising displaying pictorial diagrams of components and processes in the blade computing system.

8. The method of claim 1, further comprising displaying pictorial diagrams to assist a user locating modules in the blade computing system.

9. The method of claim 1, further comprising managing power and managing performance of the blade computing system from the integrated management controller.

10. A system comprising:
an integrated management controller for a blade computing system, the integrated management controller including at least one input device and at least one output device;
a processor operatively associated with the integrated management controller, the processor configured to execute program code for monitoring systems status in the blade computing system including port mapping for embedded network interface card (NIC) ports and mezzanine ports to corresponding interconnect modules in a rear portion of the blade computing system otherwise not visible to a user;
wherein, the at least one input device and at least one output device of the integrated management controller interacts with the user for monitoring and modifying configuration of a plurality of modules in the blade computing system; and
the integrated management controller manages power and performance of the blade computing system.

11. The system of claim 10, wherein the integrated management controller monitors and modifies configuration of all the modules in the blade computing system.

12. The system of claim 10, wherein the integrated management controller is physically located at a host site remote from a client site.

13. The system of claim 10, wherein the integrated management controller assists a user in bringing online one or more of the modules in the blade computing system.

14. The system of claim 10, wherein the integrated management controller displays controller warnings, failures, and status of all modules in the blade computing system.

15. The system of claim 10, wherein the integrated management controller displays pictorial diagrams of components and processes in the blade computing system.

16. The system of claim 10, wherein the integrated management controller displays pictorial diagrams to assist a user locating modules in the blade computing system.

17. The system of claim 10 further comprising a display on the integrated management controller to display installation of components and processes in the blade computing system.

18. The system of claim 17 further comprising a display on the integrated management controller to display steps to bring the blade computing system online after installation of components and processes in the blade computing system.

19. A system for managing a blade computing system, comprising:
means for monitoring current systems status in the blade computing system with an integrated management controller;
means for using the integrated management controller for user interaction to monitor and modify configuration of all of a plurality of modules in the blade computing system, configuration including a graphic representation of port mapping for embedded network interface card (NIC) ports and mezzanine ports to each specific interconnect module for rear ports otherwise not visible to a user, the graphic representation including same icons used on physical enclosure bays and server hood labels so that a user can understand connectivity in the computing system;
means for using the integrated management controller for assisting a user with installation of a new module in the blade computing system; and
wherein the integrated management controller manages power and performance of the blade computing system.

20. The system of claim 19, further comprising means for providing security to applications and data on the blade computing system while simultaneously providing user interaction with the blade computing system.

* * * * *